Oct. 14, 1930.        J. R. KINNEY        1,778,078
OIL SEPARATOR
Filed Oct. 19, 1927
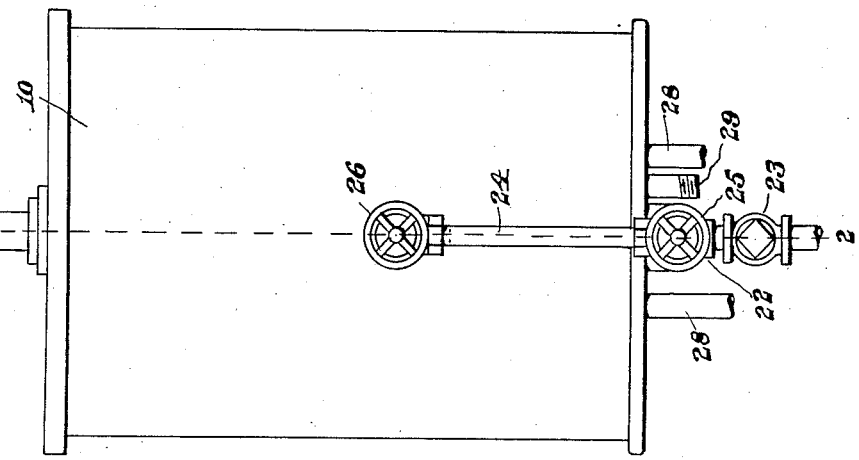
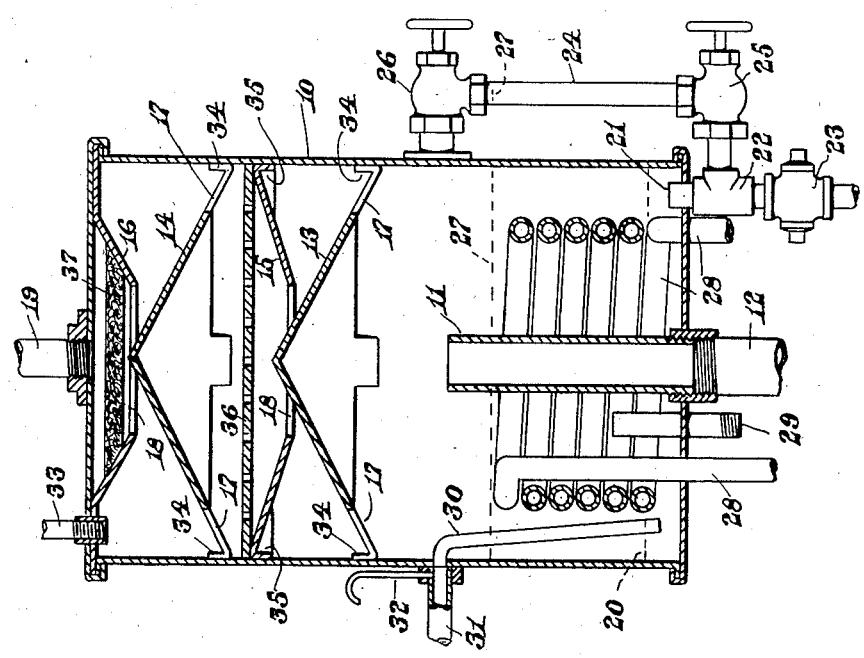
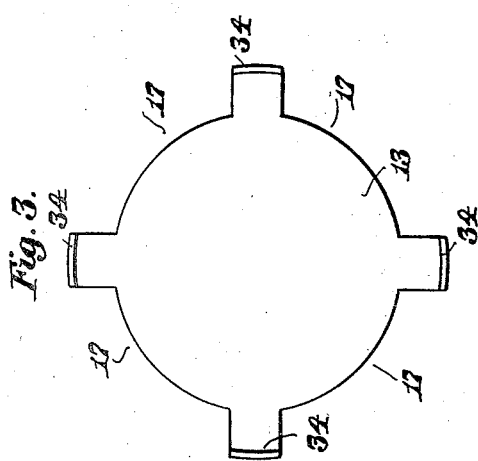
Inventor:
Justus R. Kinney,
by Walter E. Lombard, Atty.

Patented Oct. 14, 1930

1,778,078

UNITED STATES PATENT OFFICE

JUSTUS R. KINNEY, OF JAMAICA PLAIN, MASSACHUSETTS, ASSIGNOR TO KINNEY MANUFACTURING COMPANY, OF BOSTON, MASSACHUSETTS

OIL SEPARATOR

Application filed October 19, 1927. Serial No. 227,206.

This invention relates to oil separators and particularly to devices of this character adapted for use in connection with a vacuum pump or an air compressor, the object of the invention being to provide means whereby the oil used in the pump or air compressor may have all water and air removed therefrom and then returned to the pump or air compressor to be used over again.

This object is attained by the mechanism illustrated in the accompanying drawing.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents an elevation of an oil separator embodying the principles of the present invention.

Figure 2 represents a vertical section of same on line 2, 2 on Fig. 1, and

Figure 3 represents a plan of one of the baffle plates.

Similar characters indicate like parts throughout the several figures of the drawings.

In the drawings, 10 is a tank having an inlet pipe 11 preferably extending through the bottom thereof with its lower end communicating with a pipe 12 leading to the outlet from a vacuum pump or air compressor.

Obviously the pipe 11 may extend through the side of the tank and near the bottom thereof provided its discharge end is above the oil level with its outlet directed upwardly.

In the operation of a vacuum pump or air compressor air is discharged which is mixed to some extent with oil and it is desired to use the latter over and over again to lubricate the moving parts of the pump or air compressor.

In order to use this oil again it is necessary prior to its discharge into the oil inlet of the vacuum pump or air compressor to remove therefrom all air and water which may become mixed therewith.

Above the inlet pipe 11 are a plurality of baffle plates 13 to 16 inclusive, all of these baffle plates preferably being cone-shaped with the baffle plates 13, 14 provided with passages 17 therethrough at the edges thereof while the baffle plates 15, 16 have central passages 18 therethrough.

The baffle plates 13, 14 have the walls thereof inclined upwardly toward the center thereof, the apex of each baffle plate 13, 14 extending into a central passage 18 in one of the baffle plates 15, 16, the wall of which is inclined downwardly toward the center of the tank, as indicated in Fig. 2.

From the upper end of the tank 10 extends an air outlet pipe 19.

As the air impregnated with oil is admitted through the pipe 11 under considerable force it is splashed against the lower baffle plate 13 from which it rebounds and the air mixed with the oil is separated from the oil and then permitted to be discharged through the passages 17 and 18 and pipe 19.

Any water which is mixed with the oil and air is separated therefrom by condensation upon the baffle plates and collects in the bottom of the tank, while the oil collects in the bottom of said tank above the water level 20.

A pipe 21 extends downwardly through the bottom of the tank and has a T 22 therein, one branch of which connects to a valve 23 which may be opened when it is desired to remove all fluid from the tank.

Another branch of the T 22 connects with a gage 24 of usual construction having a valve 25 at its lower end and a valve 26 at its upper end communicating with the interior of the tank 10.

By means of this gage the oil level 27 within the tank will be indicated in the gage 24.

Owing to the rapid operation of the vacuum pump the oil admitted to the tank 10 through the inlet pipe 11 is often overheated and it is essential that it should be cooled prior to its return to the vacuum pump.

In order to cool the oil in the tank a cooling coil 28 is provided through which a cooling medium is adapted to be forced from any suitable source.

This cooling coil 28 is preferably immersed in the oil and surrounds the inlet pipe 11, as indicated in Fig. 2.

An oil discharge pipe 29 extends through the bottom of the tank and may be connected with any suitable pipe leading to the oil inlet of the vacuum pump or air compressor, the upper end of this pipe 29 extending upwardly through the water and into the oil collected in the bottom of the tank. The cooled oil on return to pump keeps the pump cool.

Through the wall of the tank at a point above the oil level extends a pipe 30 projecting downwardly into the bottom of the tank below the water level 20, this pipe being for the purpose of permitting the water to overflow from the tank and be discharged into any suitable receptacle through the pipe 31.

Outside of the wall of the tank 10 and communicating with the overflow pipe 30, 31 is a vent 32 which prevents a syphon being created in the water overflow pipe.

Through the top of the tank 10 extends a pipe 33 which may be used to admit a fluid to the interior of the tank to clean the interior thereof when the valve 23 is open and it is desired to drain all fluid from the tank and remove such impurities as may have been collected therein.

The pipe 33 may be used to admit an additional supply of fresh oil when needed.

Each baffle plate 13, 14 is provided with ears 34 and the baffle plate 15 with an annular flange 35, said ears and flange preferably being soldered to the inner face of the wall of the tank 10.

Above one of the baffle plates, as for instance, the baffle plate 15, is disposed a perforated plate 36 which materially assists in the separation of the oil from the air as the latter passes upwardly in the tank to escape through the pipe 19.

Sometimes fine particles of oil are mixed with the air and obviously it is desirable to recover all of this oil and prevent the escape of any portion thereof.

This is accomplished by interposing between one of the baffle plates, as for instance the baffle plate 16, and the discharge pipe 19, a layer of cotton waste 37.

Any fine particles of oil remaining in the air when it reaches this layer of cotton waste 37 will be caught thereby and gradually drop therefrom to the lower end of the tank 10.

It is self-evident, therefore, that by means of the various baffle plates 13, 14, 15 and 16, perforated plate 36 and layer of cotton waste 37, practically every particle of oil will be recovered and the air finally passing outwardly through the pipe 19 will be substantially free from both oil and water.

By means of this device all water and air which may have become mixed with the oil while in the vacuum pump or air compressor can be removed therefrom and pure oil discharged from the tank to be used over and over again to lubricate the pump or air compressor during its operation.

When the air mixed with oil is discharged from the inlet pipe 11 the force of the discharge will cause it to strike the lower baffle plate and by this impact most of the oil mixed with the air will be separated therefrom and drop to the bottom of the tank. If any air passing upwardly through the passages 17, 18 to the outlet 19 has any water or oil combined therewith this water and oil will run down the inclined surfaces of the various baffle plates and through the passages 17 and 18 to the bottom of the tank.

This makes a very convenient device to be attached to a vacuum pump or the like whereby the oil may be separated from the discharged air and subsequently have all impurities removed therefrom, to be returned to the pump in a pure condition for the purpose of lubricating the moving elements of the same, thus making a great saving in the operation of the pump due to the fact that the same oil may be used repeatedly for the purpose of lubrication.

It is believed that the operation and many advantages of the invention will be understood without further description.

Having thus described my invention, I claim—

1. A tank adapted to hold water and oil in the bottom thereof; an inlet pipe constantly open extending through the bottom thereof and adapted to discharge upwardly therefrom air mixed with oil and water; a series of superimposed baffle plates alined with and above the outlet of said inlet pipe whereby the oil and water may be separated from the air by impact with said plates, the lower baffle plate being imperforate at the center; an air outlet above said baffle plates constantly open; means for withdrawing water from the bottom of the tank to a point above the oil level; and an oil discharge pipe always open with its inlet end above the water level.

2. A tank adapted to hold water and oil in the bottom thereof; an inlet pipe extending through the bottom thereof and adapted to discharge upwardly therefrom air mixed with oil and water; baffle plates alined with and above the outlet of said inlet pipe whereby the oil and water may be separated from the air by impact with said plates; an air outlet; an oil discharge pipe always open with its inlet end above the water level; means for withdrawing water from the bottom of the tank to a point above the oil level; and means submerged in said oil for cooling said oil prior to discharge from said tank.

3. A tank adapted to hold water and oil in the bottom thereof; an inlet pipe extending through the bottom thereof and adapted to discharge upwardly therefrom air mixed with oil and water; baffle plates alined with and above the outlet of said inlet pipe whereby the oil and water may be separated from the air by impact with said plates; an air outlet; an oil discharge pipe always open with its inlet above the water level; means for withdrawing water from the bottom of the tank to a point above the water level; and a cooling coil submerged in said oil and surrounding the inlet pipe.

4. A tank adapted to hold water and oil in the bottom thereof; an inlet for admitting air mixed with oil and water through the bottom of said tank and discharging the mixture upwardly; means for withdrawing water free from oil from the bottom of the tank to a point above the oil level; a plurality of baffle plates above said inlet in the path of the discharged mixture, said baffle plates being inclined alternately in opposite directions and forming means whereby water and oil condensing thereon may flow downwardly toward the bottom of said tank, the lower baffle plate being conical with an imperforate center and its edges being spaced from the wall of said tank; and an oil discharge pipe.

5. A tank adapted to hold water and oil in the bottom thereof; an inlet for admitting air mixed with oil and water to said tank and discharging the mixture upwardly; an oil discharge pipe; an air outlet from the top of said tank; means for withdrawing water from the bottom of the tank to a point above the oil level; and a plurality of baffle plates above said inlet in the path of the discharged mixture and forming means for comminuting the oil and water in said mixture by impact therewith, said baffle plates being inclined alternately in opposite directions with the lower plate cone shaped and imperforate at the center, a portion of said baffle plates having passages at their edge and inclining upwardly toward the center thereof with the intermediate baffle plates provided with central passages and inclining downwardly from their edges.

6. A tank adapted to hold water and oil in the bottom thereof; an inlet pipe to said tank adapted to discharge upwardly air mixed with oil and water; baffle plates above said inlet in the path of the discharged mixture and forming means for comminuting the oil and water in said mixture by impact therewith; an air outlet above said baffle plates; an oil discharge pipe with its inlet end above the water level and below the normal oil level; and a water discharge pipe leading from the water in the bottom of said tank and extending through the tank wall above the oil level.

7. A tank adapted to hold water and oil in the bottom thereof; an inlet pipe to said tank adapted to discharge upwardly air mixed with oil and water; baffle plates above said inlet in the path of the discharged mixture and forming means for comminuting the oil and water in said mixture by impact therewith; an air outlet above said baffle plates; an oil discharge pipe with its inlet immediately above the water level; a water discharge pipe leading from the lower end of said tank and extending through the tank wall above the oil level; and a vent for said water discharge pipe outside the tank.

8. A tank adapted to hold water and oil in the bottom thereof; an inlet pipe extending through a wall of said tank and adapted to discharge upwardly into the center of said tank air mixed with oil and water; means above and alined with said inlet pipe for separating oil and water from the air; an air outlet above said separating means and alined with said pipe an oil outlet from said tank; means for withdrawing water from the bottom of the tank to a point above the oil level; and means for cooling the oil within said tank prior to its discharge therefrom.

9. A tank adapted to hold water in the bottom thereof; an inlet pipe extending through a wall thereof and adapted to discharge upwardly air mixed with oil and water; baffle plates above said oil inlet pipe in the path of the discharged mixture adapted to comminute the oil and water in said mixture and permit them to collect in the bottom of said tank; a perforated plate also above the oil inlet pipe; and an oil discharge pipe constantly open with its inlet end immediately above the level of the water in said tank.

Signed by me at 746 Old South Bldg., Boston, Massachusetts, this 17th day of October, 1927.

JUSTUS R. KINNEY.